(12) United States Patent
Takamizawa et al.

(10) Patent No.: US 12,474,535 B2
(45) Date of Patent: Nov. 18, 2025

(54) OPTICAL WIRING UNIT AND OPTICAL TERMINATION BOX

(71) Applicant: Fujikura Ltd., Tokyo (JP)

(72) Inventors: Hiroyuki Takamizawa, Sakura (JP);
Toshiaki Nakajima, Sakura (JP);
Hiroyoshi Shibata, Sakura (JP)

(73) Assignee: Fujikura Ltd., Tokyo (JP)

( * ) Notice: Subject to any disclaimer, the term of this patent is extended or adjusted under 35 U.S.C. 154(b) by 262 days.

(21) Appl. No.: 18/031,971

(22) PCT Filed: May 6, 2021

(86) PCT No.: PCT/JP2021/017366
§ 371 (c)(1),
(2) Date: Apr. 14, 2023

(87) PCT Pub. No.: WO2022/085228
PCT Pub. Date: Apr. 28, 2022

(65) Prior Publication Data
US 2023/0408785 A1    Dec. 21, 2023

(30) Foreign Application Priority Data

Oct. 23, 2020 (JP) .................. 2020-178231

(51) Int. Cl.
*G02B 6/00* (2006.01)
*G02B 6/44* (2006.01)
(52) U.S. Cl.
CPC ....... *G02B 6/44526* (2023.05); *G02B 6/4455* (2013.01)
(58) Field of Classification Search
CPC ..... G02B 6/44526; G02B 6/4455; G02B 6/00
See application file for complete search history.

(56) References Cited

U.S. PATENT DOCUMENTS 8,620,123 B2 * 12/2013 Dean, Jr. ................ G02B 6/443
385/100
2002/0122648 A1    9/2002 Mule' et al.
(Continued)

FOREIGN PATENT DOCUMENTS

JP    2001-21853 A     1/2001
JP    2007-311777 A   11/2007
(Continued)

OTHER PUBLICATIONS

International Search Report issued in corresponding International Application No. PCT/JP2021/017366; mailed Jul. 13, 2021 (2 pages).

*Primary Examiner* — Jennifer Doan
(74) *Attorney, Agent, or Firm* — Osha Bergman Watanabe & Burton LLP

(57) ABSTRACT

An optical wiring unit includes a tray, an operating member supported by the tray and that moves in a front-rear direction of the optical wiring unit as a reference to a neutral position, a slide piece including a latch, and one or more springs that bias the operating member toward the neutral position. The slide piece slides with respect to the operating member between a restriction position and a release position. A protrusion amount of the slide piece from the operating member at the release position is smaller than a protrusion amount of the slide piece from the operating member at the restriction position. The slide piece is disposed at the restriction position when the operating member is at the neutral position and slides toward the release position when the operating member moves in the front-rear direction from the neutral position.

12 Claims, 12 Drawing Sheets

(56) References Cited

U.S. PATENT DOCUMENTS

| | | |
|---|---|---|
| 2006/0132914 A1 | 6/2006 | Weiss et al. |
| 2008/0063802 A1 | 3/2008 | Maula et al. |
| 2008/0205838 A1 | 8/2008 | Crippa et al. |
| 2012/0044572 A1 | 2/2012 | Simmonds et al. |
| 2012/0218301 A1 | 8/2012 | Miller |
| 2018/0074457 A1 | 3/2018 | Jolly et al. |
| 2018/0217395 A1 | 8/2018 | Lin et al. |
| 2019/0310426 A1 | 10/2019 | Pilon et al. |
| 2020/0081214 A1 | 3/2020 | Roa-Quispe et al. |
| 2023/0068980 A1* | 3/2023 | Hsu .................... G02B 6/44526 |

FOREIGN PATENT DOCUMENTS

| | | |
|---|---|---|
| JP | 2008032843 A | 2/2008 |
| JP | 2008-268873 A | 11/2008 |
| JP | 2009-541808 A | 11/2009 |
| JP | 2012-8356 A | 1/2012 |
| JP | 2016-85426 A | 5/2016 |
| JP | 2016-126134 A | 7/2016 |
| JP | 2017-535825 A | 11/2017 |
| JP | 2018-513414 A | 5/2018 |
| JP | 2019086693 A | 6/2019 |
| JP | 2019525225 A | 9/2019 |
| JP | 2019211698 A | 12/2019 |
| WO | 2017/203201 A1 | 11/2017 |
| WO | 2018/043625 A1 | 3/2018 |
| WO | 2018/166921 A1 | 9/2018 |

\* cited by examiner

OPTICAL WIRING UNIT AND OPTICAL TERMINATION BOX

BACKGROUND

Technical Field

The present invention relates to an optical wiring unit and an optical termination box.

Description of the Related Art

In Patent Document 1, an optical termination box including an optical wiring unit and a slide rail that slidably supports the optical wiring unit is disclosed. An adapter is disposed in the optical wiring unit, and by pulling out the optical wiring unit, work of inserting and removing an optical connector of the optical cord or the like into and from the adapter can be performed.

PATENT DOCUMENT

Patent Document 1: Japanese Unexamined Patent Application No. 2008-32843

In order to make the work easier, there is a demand for a configuration in which the optical wiring unit is capable of being fixed at a pull-out position and also, the fixing at the pull-out position is capable of being easily released.

SUMMARY

One or more embodiments provide an optical wiring unit or an optical termination box with improved workability.

An optical wiring unit according to one or more embodiments includes: a tray; an operating member supported by the tray so as to be movable on both sides in a front-rear direction as a reference to a neutral position; a slide piece having a latch portion (a latch); and a biasing portion (one or more springs) configured to bias the operating member toward the neutral position, in which the slide piece is slidable with respect to the operating member between a restriction position and a release position where a protrusion amount of the slide piece from the operating member is smaller than a protrusion amount of the slide piece at the restriction position, and the slide piece is located at the restriction position when the operating member is at the neutral position, and is configured to slide toward the release position when the operating member moves in the front-rear direction from the neutral position.

According to one or more embodiments, when the optical wiring unit is at the storage position or the pull-out position, the movement of the optical wiring unit can be restricted by locating the slide piece at the restriction position where the protrusion amount of the latch portion is large and locking the latch portion to another structure. Therefore, when performing the work of connecting the optical wiring unit which is at the pull-out position, the optical wiring unit is suppressed from moving. Additionally, in a case where the optical wiring unit is at the storage position, the optical wiring unit is suppressed from moving unexpectedly. Additionally, the restriction by the latch portion can be easily released by pushing or pulling the operating member in the front-rear direction. From the above description, it is possible to provide an optical wiring unit with improved workability.

In the optical wiring unit according to one or more embodiments, the biasing portion may include a first compression spring and a second compression spring disposed side by side in the front-rear direction, the operating member may have a first accommodating portion that accommodates the first compression spring and a second accommodating portion that accommodates the second compression spring, and the first accommodating portion and the second accommodating portion may be partitioned by a partition wall formed in the tray.

In the optical wiring unit according to one or more embodiments, the slide piece may be configured to slide in a left-right direction orthogonal to the front-rear direction, and may have an engaging portion protruding in an up-down direction orthogonal to both the front-rear direction and the left-right direction. The operating member may be formed with an engagement groove with which the engaging portion engages, and the engagement groove may have a first inclined portion inclined inward in the left-right direction toward a front side and a second inclined portion inclined inward in the left-right direction toward a rear side.

An optical termination box according to one or more embodiments includes: the optical wiring unit according to one or more embodiments; and a side rail having a front locking portion and a rear locking portion that are formed apart from each other in the front-rear direction, in which the side rail may have a rail-side restricting portion that restricts forward movement of the optical wiring unit beyond a predetermined pull-out position. The optical wiring unit may have a unit-side restricting portion that abuts the rail-side restricting portion when the optical wiring unit is at the pull-out position. The front locking portion may be disposed at a position where the latch portion is enterable when the optical wiring unit is at the pull-out position.

The optical termination box according to one or more embodiments further includes: a stopper configured to restrict rearward movement of the optical wiring unit beyond a predetermined storage position, in which the rear locking portion may be disposed at a position where the latch portion is enterable when the optical wiring unit is at the storage position.

According to one or more embodiments, it is possible to provide an optical termination box with improved workability.

DESCRIPTION OF THE EMBODIMENTS

An optical wiring unit and an optical termination box including the optical wiring unit of one or more embodiments will be described below with reference to the drawings.

Figure 1:
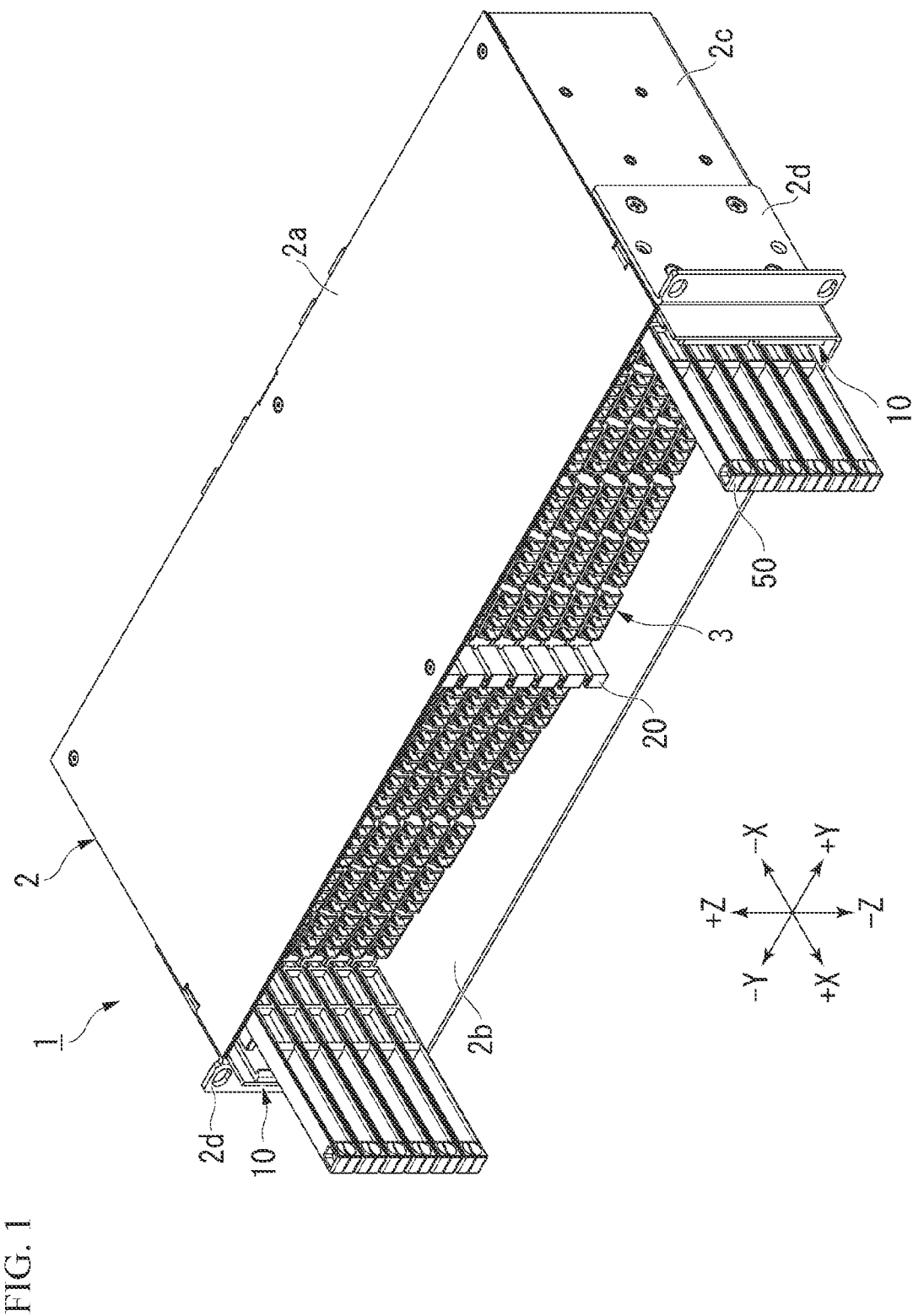
FIG. 1 is a perspective view of an optical termination box according to one or more embodiments.

As shown in FIG. 1, an optical termination box 1 includes a housing 2, a plurality of optical wiring units 3, a plurality of side rails 10, and a central rail 20. Each optical wiring unit 3 is configured to be slidable with respect to the housing 2 in a state in which the optical wiring unit 3 is supported by the side rails 10 and the central rail 20.

As shown in FIGS. 2 to 5, the optical wiring unit 3 includes a tray 30, a lid body 40, an operating member 50, a slide piece 60, a plurality of first adapters A1, and a plurality of second adapters A2. The operating member 50 protrudes from the tray 30. The tray 30, the lid body 40, the operating member 50, and the slide piece 60 may be molded products made of resin.

(Direction Definition)

In one or more embodiments, a longitudinal direction of the operating member 50 is referred to as a front-rear direction X. In the front-rear direction X, a side (+X side) where the operating member 50 protrudes from the tray 30 is referred to as a front side, and the opposite side (−X side) is referred to as a rear side. A direction in which the tray 30 and the lid body 40 face each other is referred to as an up-down direction Z. In the up-down direction Z, a side of the lid body 40 (+Z side) is referred to as an upper side, and aside of the tray 30 (−Z side) is referred to as a lower side. A direction orthogonal to both the front-rear direction X and the up-down direction Z is referred to as a left-right direction Y. In the left-right direction Y, one side (+Y side) is referred to as a right side, and the opposite side (−Y side) is referred to as a left side. In addition, the up-down direction Z may not coincide with a vertical direction.

The front-rear direction X is also a direction (sliding direction) in which the optical wiring unit 3 slides with respect to the housing 2. As shown in FIG. 1, a position of the optical wiring unit 3 in a state in which the tray 30 is stored inside the housing 2 is referred to as a "storage position". The optical wiring unit 3 is movable to a "pull-out position" where the tray 30 is pulled out of the housing 2 by sliding forward from the storage position.

As shown in FIG. 1, the housing 2 has an upper plate 2a, a lower plate 2b, and a pair of side plates 2c. The upper plate 2a and the lower plate 2b face each other in the up-down direction Z. and the pair of side plates 2c face each other in the left-right direction Y. A fixing member 2d that fixes the optical termination box 1 to an external structure (wall, pillar, cabinet, or the like) is provided on an outer side surface of each side plate 2c in the left-right direction Y. Even in a case where the optical wiring unit 3 is at the storage position, the operating member 50 of the optical wiring unit 3 protrudes forward from a front opening portion of the housing 2.

Aback plate (stopper)(not shown) is provided at a rear end portion of the housing 2. The back plate partially covers the rear end portion of the housing 2 and serves as a stopper when the optical wiring unit 3 is made to slide rearward. When the optical wiring unit 3 is in the storage position, each second adapter A2 protrudes rearward from the housing 2 through a portion (a rear opening portion of the housing 2) where the back plate is not provided. Accordingly, an external optical connector can be connected to the second adapter A2. In addition, a specific configuration of the stopper that restricts the rearward movement of the optical wiring unit 3 beyond the storage position is not limited to the back plate of the housing 2 and can be changed appropriately. For example, the side rails 10, the central rail 20, and the like may have stoppers.

Figure 2:
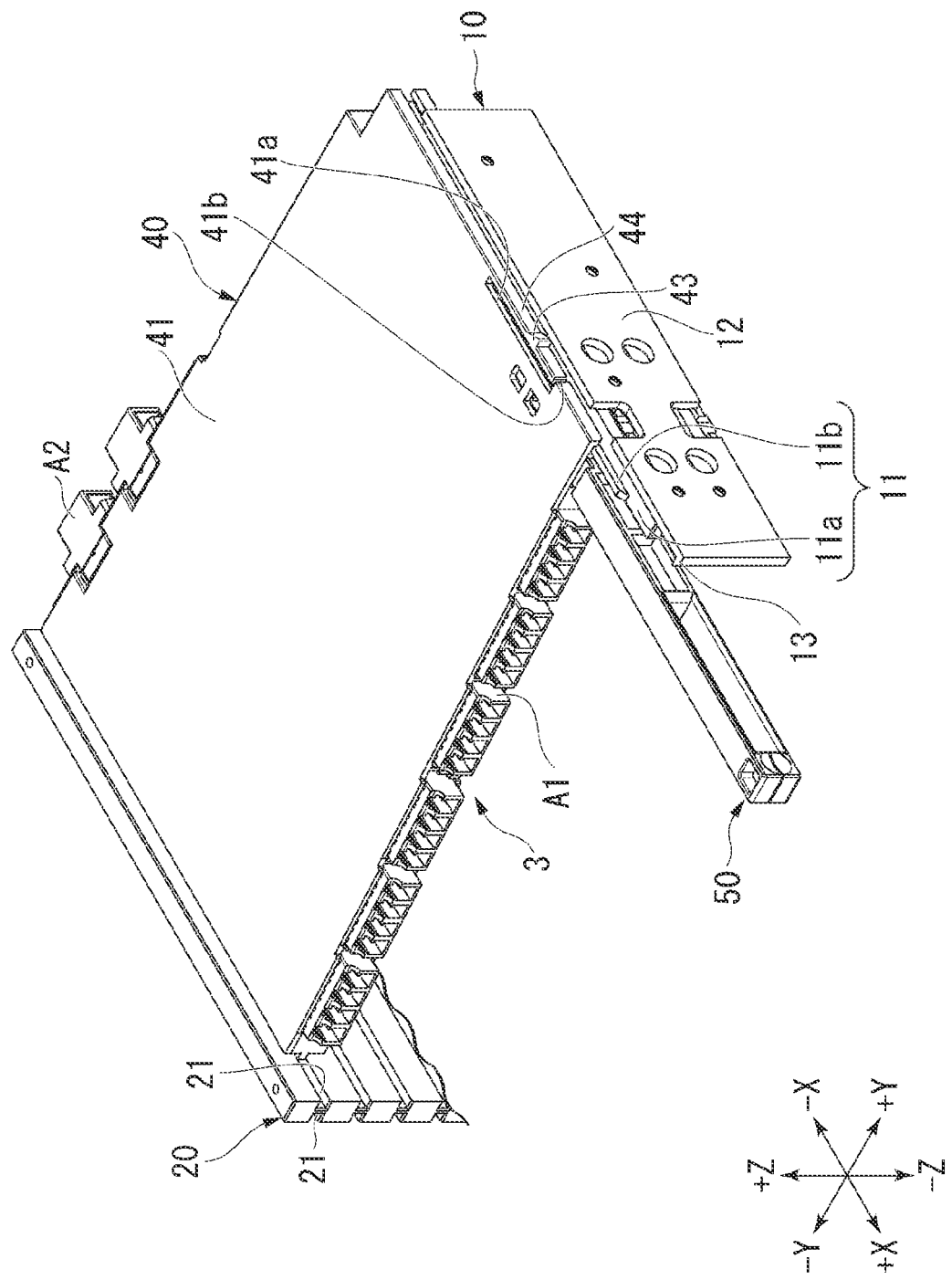
FIG. 2 is a perspective view showing a central rail, an optical wiring unit, and side rails extracted from FIG. 1.

The central rail 20 is located at a central portion in the left-right direction Y inside the housing 2. As shown in FIG. 2, the central rail 20 has a plurality of grooves 21 that extend in the front-rear direction X. Half of the grooves 21 are recessed leftward from a right side surface of the central rail 20, and the remaining half are recessed rightward from a left side surface of the central rail 20. The number of grooves 21 matches the number of optical wiring units 3.

In one or more embodiments, six optical wiring units 3 are disposed side by side in the up-down direction Z on the right side of the central rail 20. Additionally, six optical wiring units 3 are disposed side by side in the up-down direction Z on the left side of the central rail 20. That is, the optical termination box 1 of one or more embodiments includes a total of 12 optical wiring units 3. However, the number of optical wiring units 3 can be changed appropriately. Additionally, the optical wiring units 3 may be supported by, for example, a pair of side rails 10 without providing the central rail 20. That is, in the optical termination box 1, the optical wiring units 3 may not be disposed side by side in the left-right direction Y.

The optical wiring unit 3 located on the right side of the central rail 20 and the optical wiring unit 3 located on the left side thereof are substantially bilaterally symmetrical in shape. For example, the operating member 50 is disposed at a right end portion of the tray 30 in the right optical wiring unit 3, and the operating member 50 is disposed at a left end portion of the tray 30 in the left optical wiring unit 3. Correspondingly, the shape of the side rail 10 located on the right side and the side rail 10 located on the left side are substantially bilaterally symmetrical.

Hereinafter, the structures of the right optical wiring units 3 and side rail 10 will be described in detail, taking the right and left optical wiring units 3 and side rails 10 as examples. That is, the following is also a description of the left optical wiring unit 3 and side rail 10. In the left-right direction Y, a side closer to the central rail 20 is referred to as "an inner side in the left-right direction Y", and the opposite side (a side closer to the side plate 2c) is referred to as "an outer side in the left-right direction Y". When viewed from the right optical wiring unit 3, the −Y side is the "inner side in the left-right direction Y", and the +Y side is the "outer side in the left-right direction Y".

Two side rails 10 are disposed side by side in the up-down direction Z at both outer end portions of the housing 2 in the left-right direction Y. As shown in FIG. 2, each side rail 10 has three slide support portions 11 that slidably support the optical wiring unit 3. That is, one side rail 10 is configured to support three optical wiring units 3. However, the number of slide support portions 11 included in the side rail 10 can be changed appropriately. For example, the side rail 10 may have six slide support portions 11. In this case, one side rail 10 may be disposed at each outer end portion of the housing 2 in the left-right direction Y.

Figure 3:
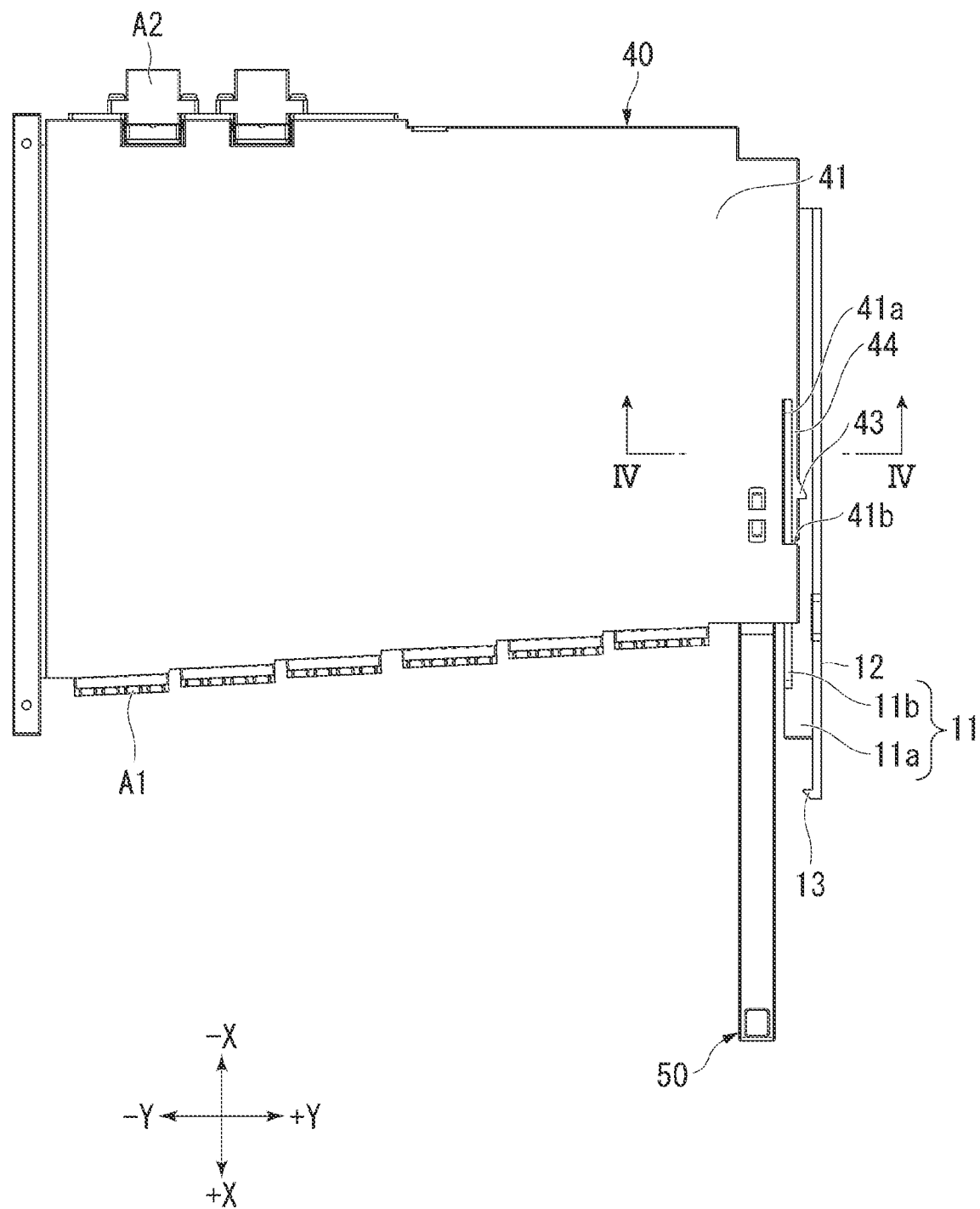
FIG. 3 is a plan view of FIG. 2 as viewed from above.
Figure 4:
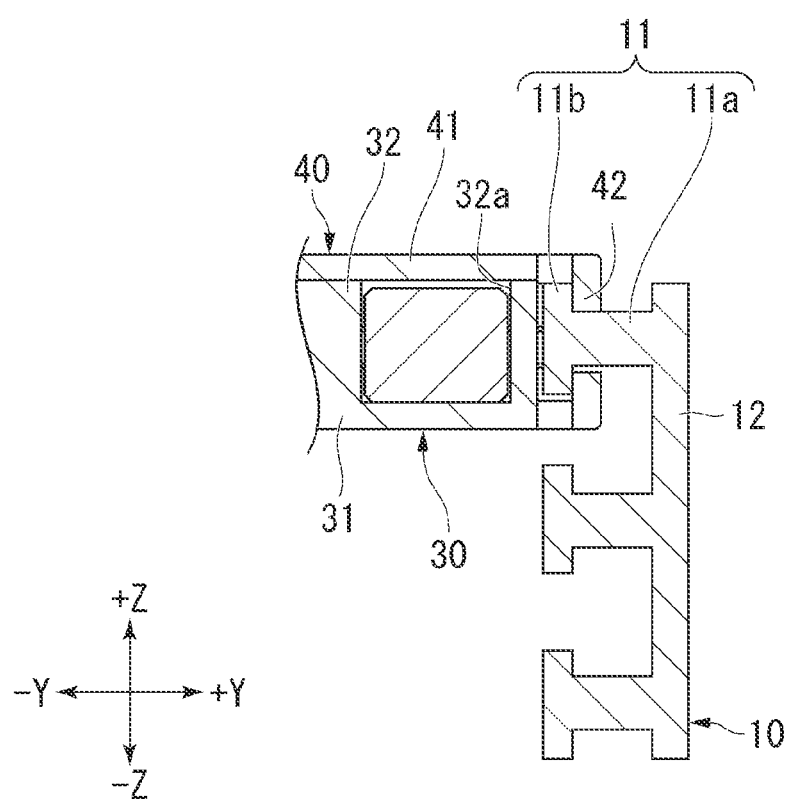
FIG. 4 is a sectional view taken along line IV-IV of FIG. 3.

As shown in FIGS. 3 and 4, the side rail 10 has a plurality of slide support portions 11, an attachment portion 12 and a rail-side restricting portion 13. The attachment portion 12 is a portion that attaches the side rail 10 to a side plate 2c of the housing 2, and has a plate shape that extends in the up-down direction Z and the front-rear direction X. A screw hole for fastening a screw is formed in the attachment portion 12. The plurality of slide support portions 11 are disposed side by side in the up-down direction Z and coupled to each other by the attachment portion 12.

Each slide support portion 11 has a rail body portion 11a and a projecting portion 11b. The rail body portion 11a protrudes inward in the left-right direction Y from the attachment portion 12. The projecting portion 11b protrudes upward and downward from an inner end portion of the rail body portion 11a in the left-right direction Y. The rail-side restricting portion 13 protrudes inward in the left-right direction Y from a front end portion of the attachment portion 12. The rail-side restricting portion 13 has a surface (rear surface) facing the rear side and an inclined surface facing the front side. The inclined surface of the rail-side restricting portion 13 is inclined inward in the left-right direction Y toward the rear side.

The lid body 40 covers the tray 30 from above. As shown in FIG. 3, the lid body 40 has a top plate 41, a side rib 42, and a first unit-side restricting portion 43. The top plate 41 has a plate shape that extends in the front-rear direction X and the left-right direction Y. As shown in FIG. 4, the side rib 42 protrudes downward from an outer end portion of the top plate 41 in the left-right direction Y. The projecting portion 11b of the side rail 10 is pinched between the side rib 42 and a side wall portion 32 of the tray 30. Accordingly, the position of the optical wiring unit 3 in the left-right direction Y with respect to the side rail 10 is determined.

As shown in FIG. 3, the first unit-side restricting portion 43 protrudes outward in the left-right direction Y from the side surface of the top plate 41 (outer side surface in the left-right direction Y). The first unit-side restricting portion 43 has a surface (front surface) facing the front side and an inclined surface facing the rear side. The inclined surface of the first unit-side restricting portion 43 is inclined inward in the left-right direction Y toward the rear side.

A through-hole 41a (upper through-hole) is formed in the top plate 41 in the vicinity of the first unit-side restricting portion 43. The through-hole 41a penetrates the top plate 41 in the up-down direction Z and extends in the front-rear direction X. The through-hole 41a is formed at a position apart from the side surface of the top plate 41 (outer end surface in the left-right direction Y) inward in the left-right direction Y. Furthermore, a cutout portion 41b (upper cutout portion) that extends outward in the left-right direction Y is formed at a front end portion of the through-hole 41a. The cutout portion 41b is open on the side surface of the top plate 41. Therefore, an elastic piece 44 (upper elastic piece) is formed between the side surface of the top plate 41 and the through-hole 41a. It can also be said that the first unit-side restricting portion 43 is formed on the elastic piece 44. A rear end portion of the elastic piece 44 is connected to the top plate 41, and the elastic piece 44 is elastically deformable in the left-right direction Y with this connection portion as a base point.

Figure 5:
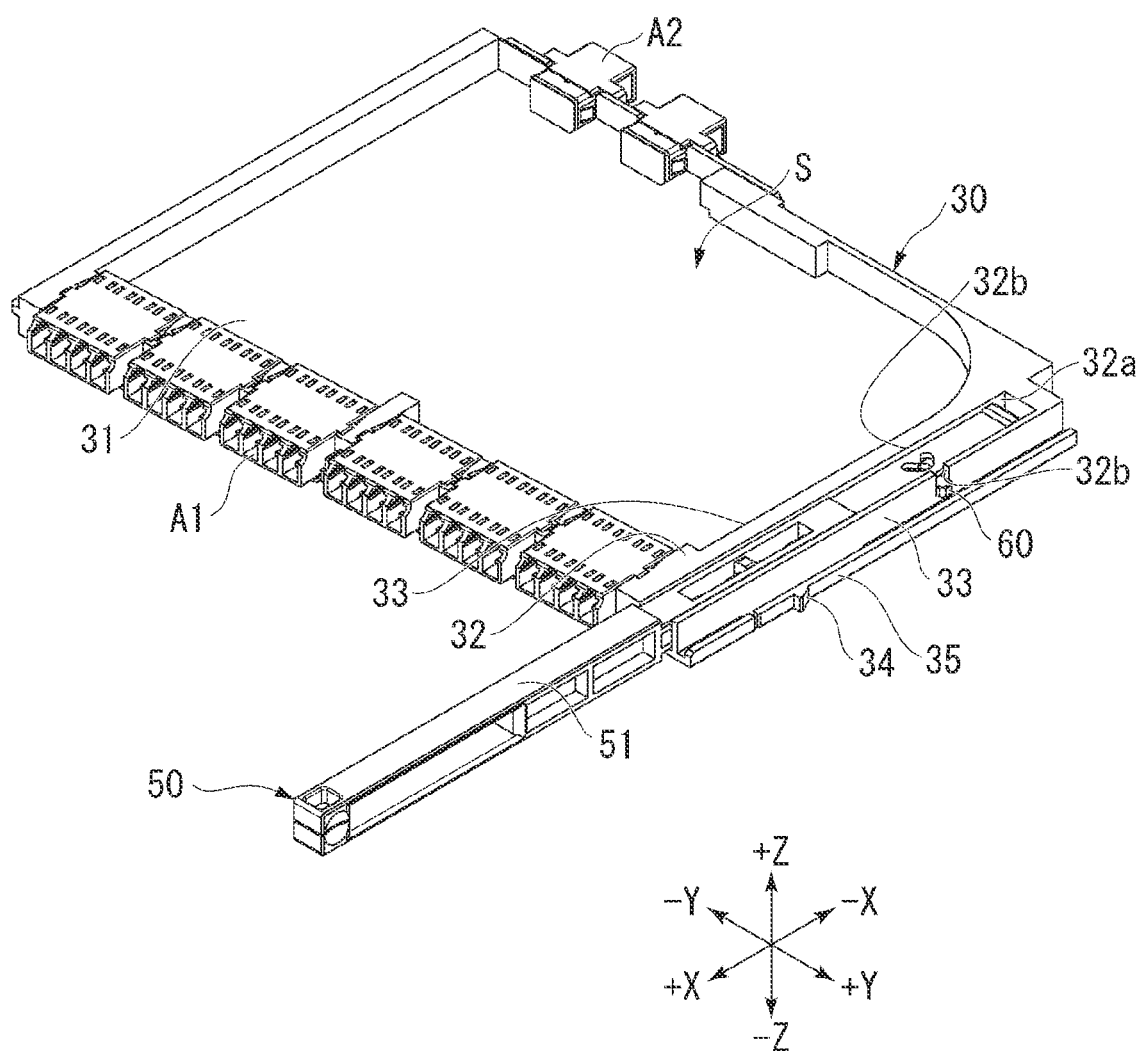
FIG. 5 is a perspective view of the optical wiring unit of FIG. 2 with a lid body removed.

The lid body 40 is fixed to the tray 30. As shown in FIG. 5, an accommodating space S (refer to FIG. 5) is formed between the tray 30 and the lid body 40. The plurality of first adapters A1 and the plurality of second adapters A2 are attached to the tray 30. The plurality of first adapters A1 are disposed side by side in the left-right direction Y and protrude forward from the tray 30. The plurality of second adapters A2 are disposed side by side in the left-right direction Y and protrude rearward from the tray 30. Each first adapter A1 is configured so that a plurality of single-core connectors can be connected from the front and rear. Each second adapter A2 is configured so that a multiple-core connector can be connected from the front and rear.

An optical connector (not shown) is connected to the second adapter A2 from the inside of the tray 30. The optical connector is, for example, a multi-fiber push-on (MPO) connector. The optical connector has a plurality of optical fibers (not shown) that connect the first adapter A1 and the second adapter A2 to each other, and an end portion of each optical fiber is provided with a single-core connector that is inserted into the first adapter A1 from the rear. The optical connector, the optical fiber, and the single-core connector provided at the end portion of the optical fiber are accommodated in the accommodating space S.

The single-core connector inserted into the first adapter A1 from the front is optically connected to another connector inserted into the second adapter A2 from the rear through the optical fiber of the optical connector. In this way, the optical wiring unit 3 can aggregate and connect a plurality of single-core connectors to one multiple-core connector.

As shown in FIG. 5, the tray 30 has a bottom plate 31, a side wall portion 32, an inner wall portion 33, and a second unit-side restricting portion 34. The bottom plate 31 has a plate shape that extends in the front-rear direction X and the left-right direction Y. The top plate 41 and the bottom plate 31 face each other at a distance from each other in the up-down direction Z. A space between the top plate 41 and the bottom plate 31 is the aforementioned accommodating space S. The inner wall portion 33 and the side wall portion 32 protrude upward from the bottom plate 31. The inner wall portion 33 and the side wall portion 32 are disposed side by side at outer end portions of the bottom plate 31 in the left-right direction Y.

The inner wall portion 33 is located inside the side wall portion 32 in the left-right direction Y. The side wall portion 32 is formed with a storage portion 32a that stores a portion of the operating member 50. The storage portion 32a is a recessed portion that is recessed downward from the upper surface of the side wall portion 32 and extends in the front-rear direction X. The storage portion 32a is open forward, and a front portion of the operating member 50 protrudes forward from the storage portion 32a. The operating member 50 is slidable in the front-rear direction X within the storage portion 32a.

The side wall portion 32 has a pair of support portions 32b that slidably support the slide piece 60. Each support portion 32b is a recessed portion that is recessed downward from the upper surface of the side wall portion 32. The pair of support portions 32b are formed to sandwich the storage portion 32a in the left-right direction Y. The pair of support portions 32b are disposed at the same position in the front-rear direction X.

The second unit-side restricting portion 34 protrudes outward in the left-right direction Y from a side surface (outer end surface in the left-right direction Y) of the bottom plate 31. The second unit-side restricting portion 34 has a surface (front surface) that faces the front side and an inclined surface that faces the rear side. The inclined surface of the second unit-side restricting portion 34 is inclined inward in the left-right direction Y toward the rear side.

Figure 8A:
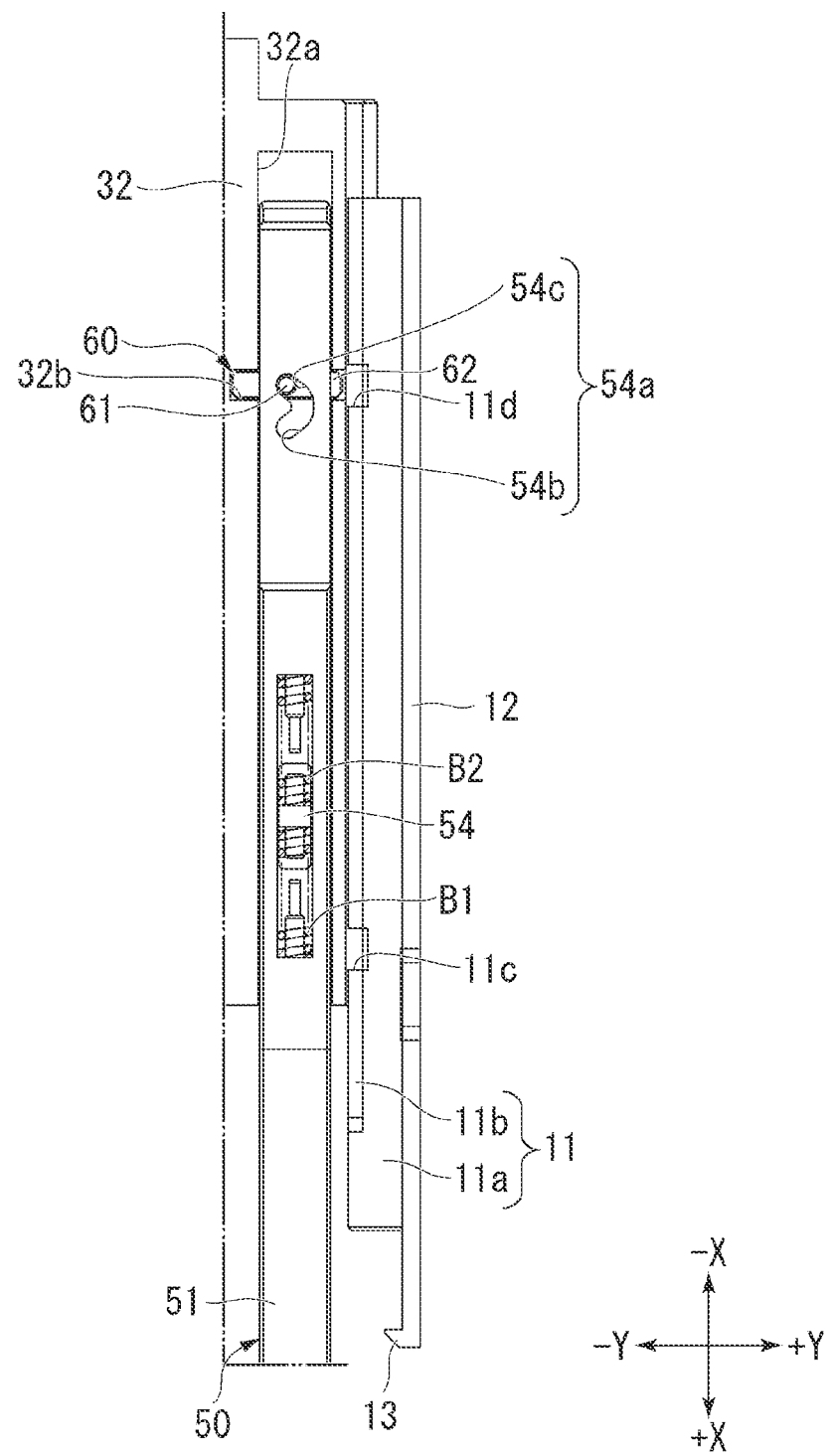
FIG. 8A is a view showing actions of respective portions when the optical wiring unit of FIG. 6 moves forward.
Figure 8B:
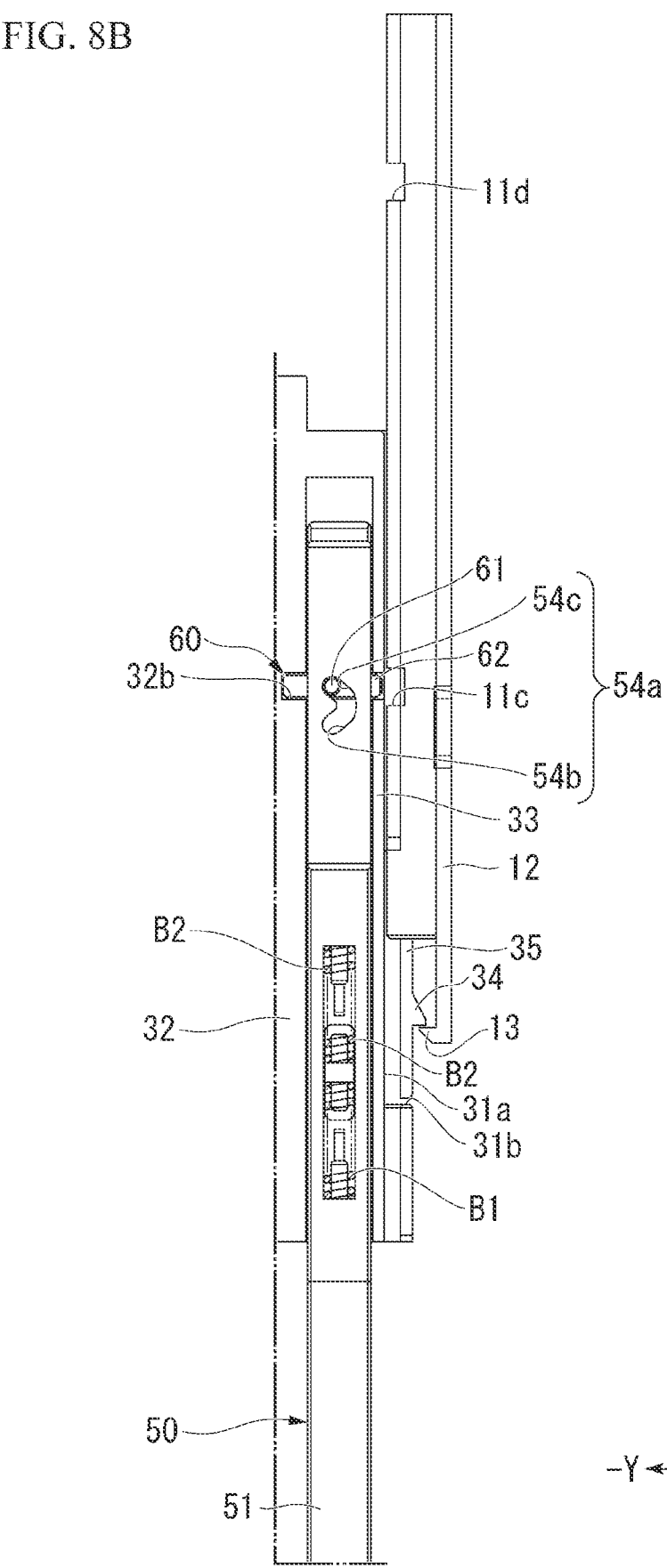
FIG. 8B is a view showing a step that follows FIG. 8A.

A through-hole 31a (lower through-hole) is formed in the bottom plate 31 in the vicinity of the second unit-side restricting portion 34 (refer to FIG. 8B). The through-hole 31a penetrates the bottom plate 31 in the up-down direction Z and extends in the front-rear direction X. The through-hole 31a is formed at a position apart from the side surface of the bottom plate 31 (outer end surface in the left-right direction Y) inward in the left-right direction Y. Furthermore, a cutout portion 31b (lower cutout portion) that extends outward in the left-right direction Y is formed at a front end portion of the through-hole 31a. The cutout portion 31b is open on the side surface of the bottom plate 31. Therefore, an elastic piece 35 (lower elastic piece) is formed between the side surface of the bottom plate 31 and the through-hole 31a. It can also be said that the second unit-side restricting portion 34 is formed on the elastic piece 35. A rear end portion of the elastic piece 35 is connected to the bottom plate 31, and the elastic piece 35 is elastically deformable in the left-right direction Y with this connection portion as a base point.

The unit-side restricting portions 34 of the tray 30 and the unit-side restricting portions 34 of the lid body 40 are disposed at the same position in the front-rear direction X and the left-right direction Y and are disposed apart from each other in the up-down direction Z. The rail-side restricting portion 13 of the side rail 10 is formed to straddle these unit-side restricting portions 34 and 43 in the up-down direction Z. When the optical wiring unit 3 is set in the housing 2 and when the optical wiring unit 3 is placed on the side rail 10 and made to slide rearward, the inclined surfaces of the unit-side restricting portions 34 and 43 and the rail-side restricting portion 13 abut each other. Accordingly, the elastic pieces 35 and 44 are elastically deformed inward in the left-right direction Y. With the elastic deformation of the elastic pieces 35 and 44, the unit-side restricting portions 34 and 43 are retracted inward in the left-right direction Y.

After the unit-side restricting portions 34 and 43 ride over the rail-side restricting portion 13 rearward, the elastic pieces 35 and 44 are restored and deformed, and the front surfaces of the unit-side restricting portions 34 and 43 and the rear surface of the rail-side restricting portion 13 face other in the front-rear direction X. After that, when the optical wiring unit 3 is made to slide forward with respect to the side rail 10, the unit-side restricting portions 34 and 43 abut the rail-side restricting portion 13, and restricts further forward movement of the optical wiring unit 3. In this case, the position of the optical wiring unit 3 is the aforementioned "pull-out position".

As shown in FIG. 5, the operating member 50 has a handle portion 51 that protrudes forward from the storage portion 32a of the tray 30. The handle portion 51 is a portion that is operated when an operator makes the optical wiring unit 3 slide between the storage position and the pull-out position.

Figure 6:
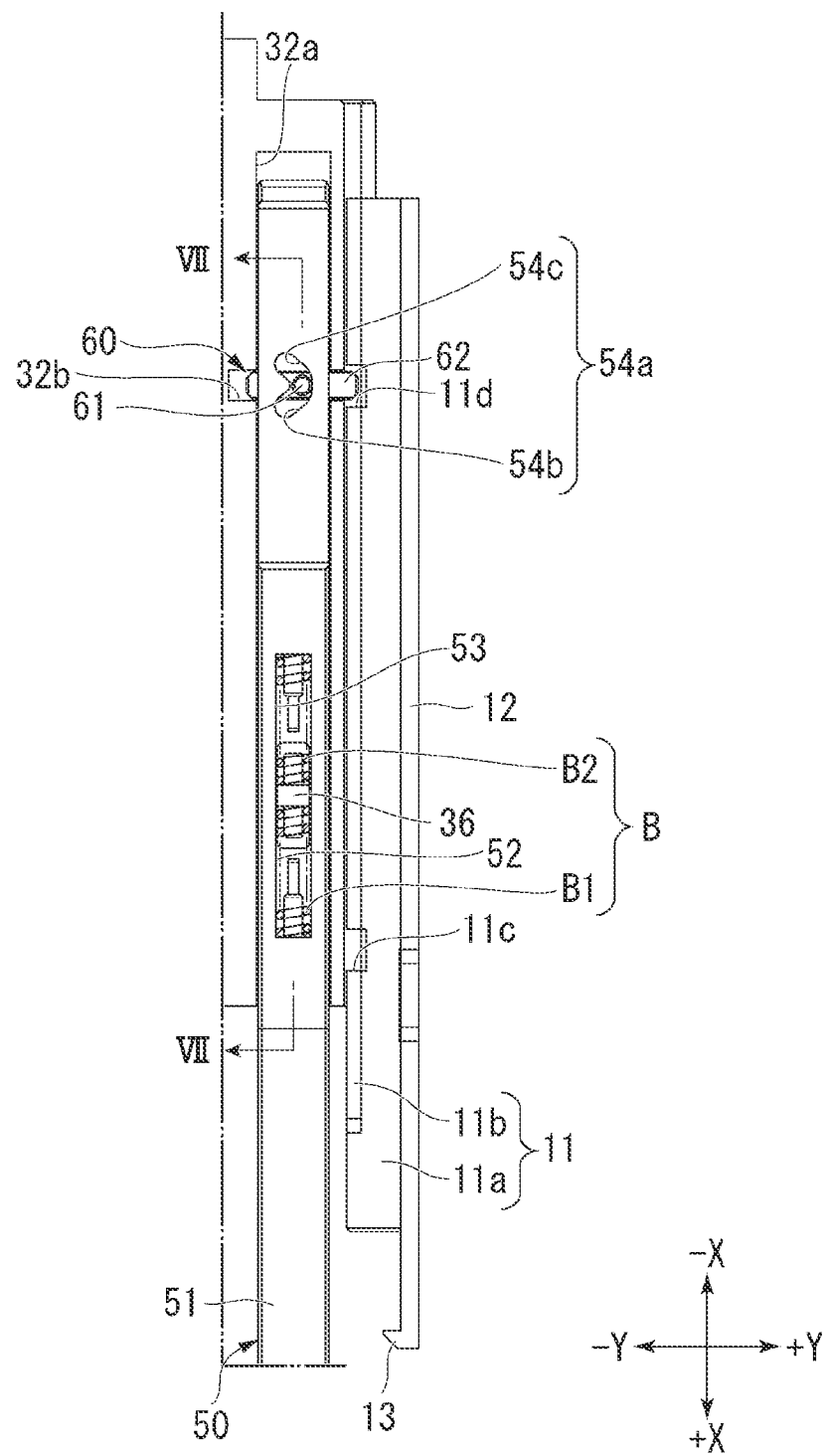
FIG. 6 is a plan view of the vicinity of a slide piece of FIG. 5.

As shown in FIG. 6, the operating member 50 has a first accommodating portion 52 and a second accommodating portion 53. The operating member 50 is biased in the front-rear direction X by a biasing portion B. The biasing portion B in one or more embodiments includes a first compression spring B1 and a second compression spring B2. A first accommodating portion 52 accommodates the first compression spring B1, and the second accommodating portion 53 accommodates the second compression spring B2. A partition wall 36 formed in the tray 30 is disposed between the first accommodating portion 52 and the second accommodating portion 53. In other words, the partition wall 36 partitions the first accommodating portion 52 and the second accommodating portion 53. The first accommodating portion 52, the partition wall 36, and the second accommodating portion 53 are disposed in this order from the front to the rear.

Figure 7:
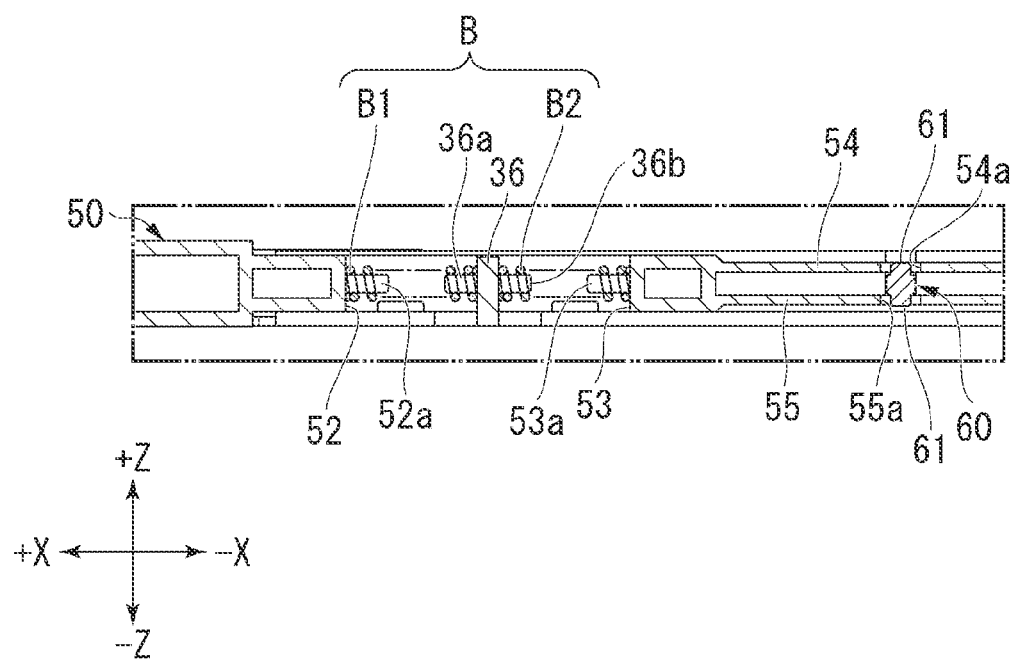
FIG. 7 is a sectional view taken along line VII-VII of FIG. 6.

As shown in FIG. 7, holding portions 52a and 36a for holding both end portions of the first compression spring B1 are provided inside the first accommodating portion 52. Additionally, holding portions 36b and 53a for holding both end portions of the second compression spring B2 are provided inside the second accommodating portion 53. The holding portion 52a protrudes rearward from an inner surface of the first accommodating portion 52, and the holding portion 36a protrudes forward from the partition wall 36. The holding portion 36b protrudes rearward from the partition wall 36, and the holding portion 53a protrudes forward from an inner surface of the second accommodating portion 53. The holding portions 52a, 36a, 36b, and 53a are columnar protrusions. However, as long as the first compression spring B1 and the second compression spring B2 can be held, the shape of the holding portions 52a, 36a, 36b, and 53a can be changed appropriately, and may be, for example, recesses.

A coil spring made of metal can be used as the first compression spring B1 and the second compression spring B2. As the compression springs B1 and B2, elastic bodies other than the coil spring made of metal (for example, coil springs made of resin or rubber) may be used. The compression springs B1 and B2 are accommodated in the first accommodating portion 52 and the second accommodating portion 53 while being compressed in the front-rear direction. Therefore, in a case where no external force acts on the operating member 50, the position of the operating member 50 in the front-rear direction is determined so that the elastic forces of the compression springs B1 and B2 are balanced. In this way, a position of the operating member 50 when the elastic forces of the compression springs B1 and B2 are balanced is referred to as "neutral position". As shown in FIG. 6, when the operating member 50 is in the neutral position, a gap in the front-rear direction X is provided between the rear end of the operating member 50 and the rear end of the storage portion 32a. Therefore, the operating member 50 is movable rearward from the neutral position.

When the external force is applied to the operating member 50 and the operating member 50 moves forward from the neutral position with respect to the tray 30, the first compression spring B1 is extended, the second compression spring B2 contracts, the elastic force becomes unbalanced, and a restoring force directed rearward acts on the operating member 50. Conversely, when the operating member 50 moves rearward from the neutral position with respect to the tray 30, the first compression spring B1 contracts, the second compression spring B2 is extended, and a restoring force directed forward acts on the operating member 50. Therefore, when the external force in the front-rear direction X acts on the operating member 50, the operating member 50 moves from the neutral position, but when the external force is released, the operating member 50 is restored and displaced toward the neutral position.

As described above, the operating member 50 is supported by the tray 30 so as to be movable on both sides (+X sides) in the front-rear direction X as a reference to the neutral position. Additionally, the biasing portion B (the first compression spring B1 and the second compression spring B2) is configured to bias the operating member 50 toward the neutral position.

As shown in FIG. 7, the operating member 50 has an upper plate portion 54 and a lower plate portion 55. The upper plate portion 54 and the lower plate portion 55 are disposed at a distance in the up-down direction Z. An engagement groove 54a (upper engagement groove) is formed in the upper plate portion 54, and an engagement groove 55a (lower engagement groove) is formed in the lower plate portion 55. The engagement grooves 54a and 55a penetrate the upper plate portion 54 and the lower plate portion 55 in the up-down direction Z.

As shown in FIG. 6, the engagement groove 54a is formed in a V shape when viewed from above. More specifically, the engagement groove 54a has a first inclined portion 54b and a second inclined portion 54c. The first inclined portion 54b is inclined inward in the left-right direction Y toward the front side, and the second inclined portion 54c is inclined inward in the left-right direction Y toward the rear side. Although not shown, the engagement groove 55a of the lower plate portion 55 also has the same shape as the engagement groove 54a of the upper plate portion 54. That is, the engagement groove 55a is formed in a V shape when viewed from below and includes a first inclined portion inclined inward in the left-right direction Y toward the front side and a second inclined portion inclined inward in the left-right direction Y toward the rear side.

As shown in FIGS. 6 and 7, the slide piece 60 has a pair of engaging portions 61 and a latch portion 62. The latch portion 62 extends in the left-right direction Y and is located between the upper plate portion 54 and the lower plate portion 55. The latch portion 62 protrudes from the operating member 50 to both sides (+Y side) in the left-right direction Y. Both end portions of the latch portion 62 in the left-right direction Y are supported by a pair of support portions 32b of the tray 30. The pair of engaging portions 61 each protrude upward and downward from a central portion of the latch portion 62 in the left-right direction Y. The upper engaging portion 61 is located within the engagement groove 54a, and the lower engaging portion 61 is located within the engagement groove 55a. The slide piece 60 is configured to be slidable in the left-right direction Y with respect to the operating member 50.

As shown in FIG. 6, a front locking portion 11c and a rear locking portion 11d are formed in the slide support portion 11 of the side rail 10. The front locking portion 11c and the rear locking portion 11d are cutouts formed so as to penetrate the rail body portion 11a and the projecting portion 11b of the slide support portion 11 in the up-down direction Z. The front locking portion 11c is located forward of the rear locking portion 11d. When the optical wiring unit 3 is located at the storage position (FIG. 6 or the like), the latch portion 62 is located inside the rear locking portion 11d. Therefore, the forward movement of the optical wiring unit 3 with respect to the side rail 10 is restricted.

As described above, the slide piece 60 is slidable in the left-right direction Y with respect to the operating member 50. In the present specification, a position of the slide piece 60 when the latch portion 62 is located inside the front locking portion 11c or the rear locking portion 11d is referred to as a "restriction position". Additionally, a position of the slide piece 60 when the latch portion 62 is disengaged from the front locking portion 11c or the rear locking portion 11d is referred to as a "release position".

Next, the action of the optical wiring unit 3 configured as described above will be described using FIGS. 6 and 8A to 8E.

As shown in FIG. 6, in a state in which the optical wiring unit 3 is in the storage position and before the operating member 50 is operated, the engaging portion 61 above the slide piece 60 is located at the connection portion between the first inclined portion 54b and the second inclined portion 54c. Since the latch portion 62 is located inside the rear locking portion 11d, the slide piece 60 and the operating member 50 are restricted from moving in the front-rear direction X with respect to the side rail 10. Additionally, since no external force is applied to the operating member 50, the operating member 50 is in the neutral position with respect to the tray 30.

When the operator pulls out the optical wiring unit 3 from the housing 2, the operator grips the handle portion 51 of the operating member 50 and pulls it forward. When the exter-nal force is applied in this manner, the operating member 50 moves forward from the neutral position with respect to the tray 30. At this time, when the first compression spring B1 is extended, the second compression spring B2 contracts, and the operating member 50 is biased rearward. Additionally, as shown in FIG. 8A, the upper engaging portion 61 slides along the second inclined portion 54c of the engagement groove 54a. Similarly, the lower engaging portion 61 slides along the second inclined portion of the engagement groove 55a. Since the operations of the pair of engaging portions 61 with respect to the engagement grooves 54a and 55a are the same, the operation of the upper engaging portion 61 will be described below using the operation of the pair of engaging portions 61 as an example.

When the engaging portion 61 slides toward a rear end portion of the second inclined portion 54c, the slide piece 60 moves inward in the left-right direction Y. Therefore, the latch portion 62 is disengaged from the rear locking portion 11d, and the optical wiring unit 3 is movable forward with respect to the side rail 10. Since the latch portion 62 is supported by the support portion 32b, when the operator continues to pull the operating member 50 forward, a forward-directed force acts on the tray 30 as well. Therefore, the optical wiring unit 3, as a whole, moves forward.

As shown in FIG. 8B, when the optical wiring unit 3 moves forward by a predetermined amount, the second unit-side restricting portion 34 abuts the rail-side restricting portion 13. At this time, although not shown, the first unit-side restricting portion 43 also abuts the rail-side restricting portion 13. In this way, the unit-side restricting portions 34 and 43 abut the rail-side restricting portion 13, thereby restricting the forward movement of the optical wiring unit 3 beyond the pull-out position. Since the operating member 50 is biased rearward by the balance of elastic forces of the compression springs B1 and B2, when the operator releases the hand from the operating member 50, the operating member 50 moves rearward with respect to the tray 30. At this time, the slide piece 60 slides outward in the left-right direction Y as the engaging portion 61 moves along the second inclined portion 54c.

Figure 8C:
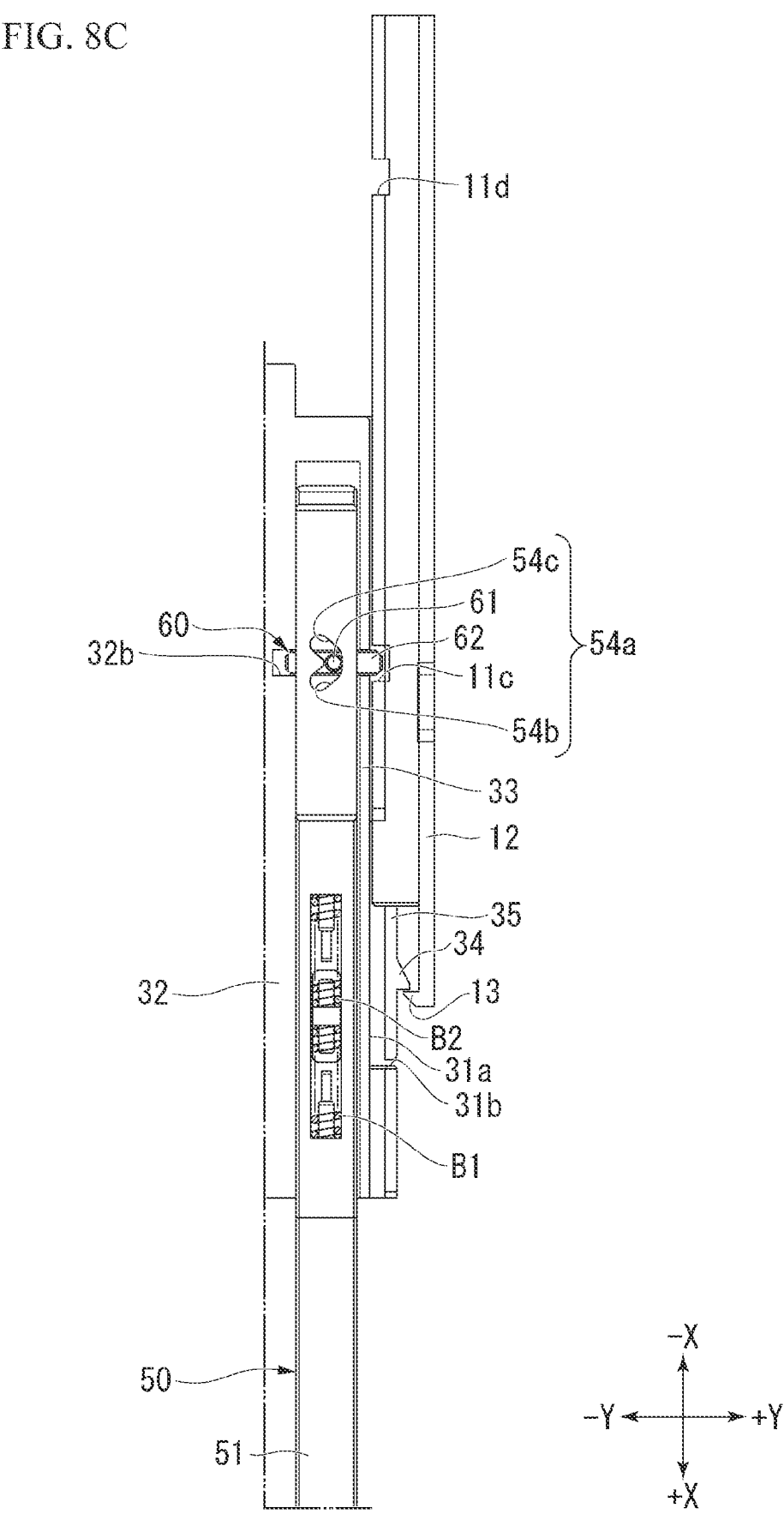
FIG. 8C is a view showing a step that follows FIG. 8B.

As shown in FIG. 8C, the operating member 50 moves rearward and reaches the neutral position, and the latch portion 62 enters the front locking portion 11c. Accordingly, the movement of the optical wiring unit 3 in the front-rear direction X with respect to the side rail 10 is restricted. Therefore, when the operator performs an operation such as inserting a connector into the first adapter A1, the movement of the optical wiring unit 3 rearward is restricted even though the external force toward the rear acts on the optical wiring unit 3. Accordingly, the optical wiring unit 3 is stably located at the pull-out position, and the work of connecting the connector to the first adapter A1, or the like can be easily performed.

Figure 8D:
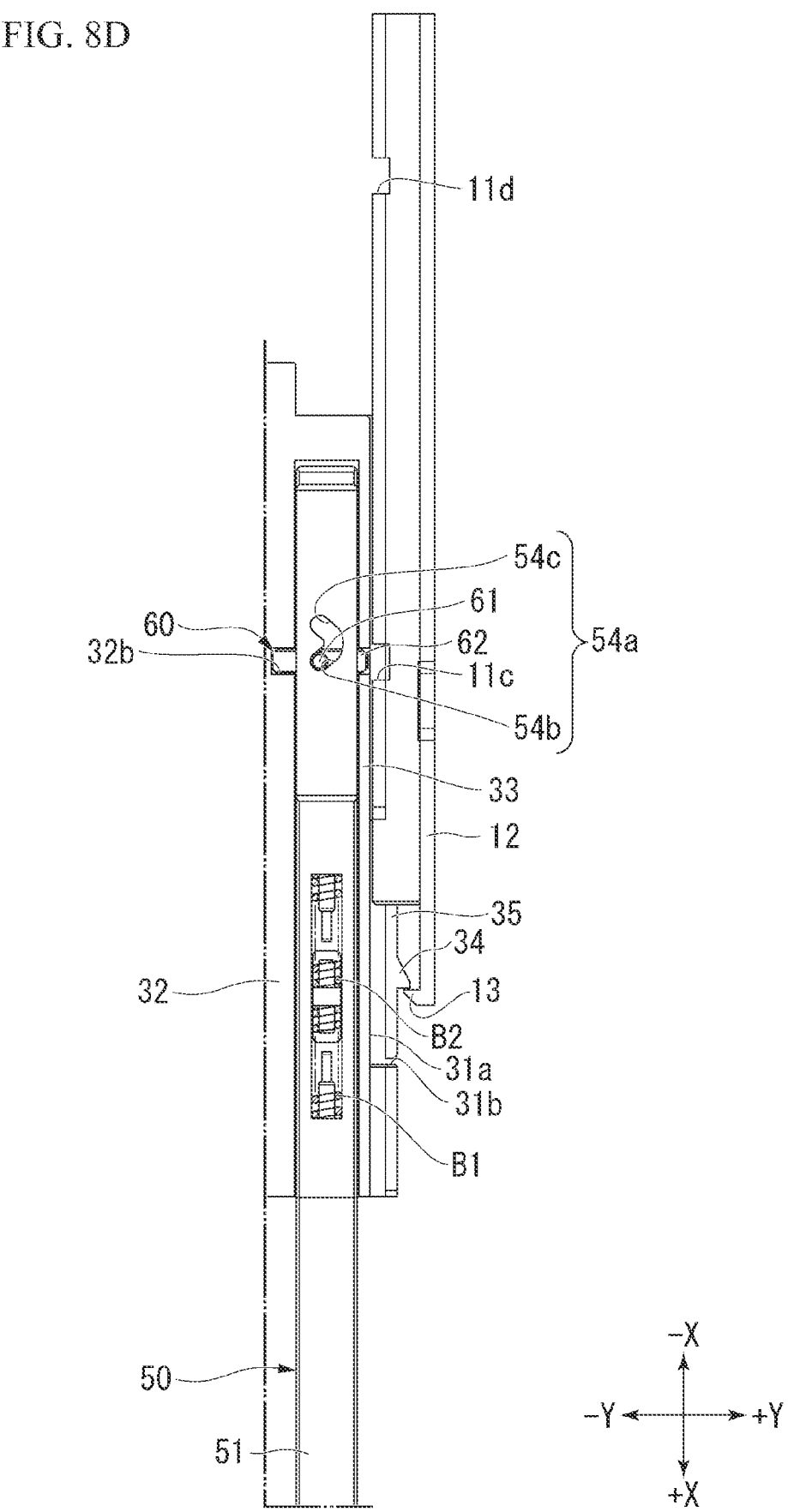
FIG. 8D is a view showing a step that follows FIG. 8C.
Figure 8E:
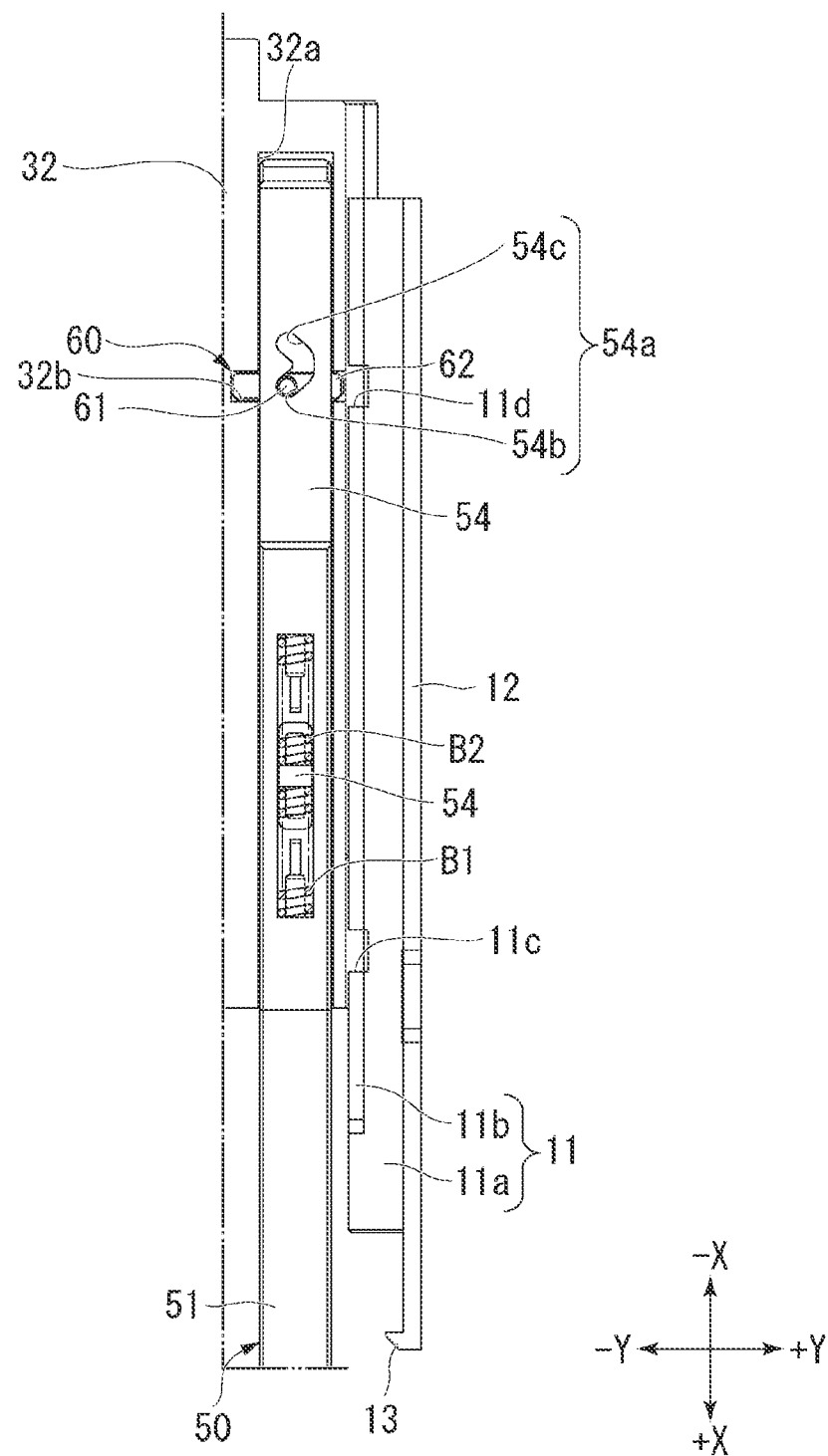
FIG. 8E is a view showing a step that follows FIG. 8D.

When the optical wiring unit 3 is stored in the housing 2 again, the operator performs the operation of pushing the handle portion 51. When the external force is applied in this manner, the operating member 50 moves rearward from the neutral position with respect to the tray 30. At this time, the first compression spring B1 contracts, the second compression spring B2 extends, and the operating member 50 is biased forward. Additionally, as shown in FIG. 8D, the engaging portion 61 slides along the first inclined portion 54b of the engagement groove 54a. When the engaging portion 61 slides toward a front end portion of the first inclined portion 54b, the slide piece 60 moves inward in the left-right direction Y. Therefore, the latch portion 62 is disengaged from the front locking portion 11c, and the optical wiring unit 3 is movable rearward with respect to the side rail 10.

When the operating member 50 is further pushed rearward, the optical wiring unit 3 moves rearward with respect to the side rail 10, and the movement stops when the optical wiring unit 3 abuts the back plate of the housing 2. When the operator releases the hand from the operating member 50 in this state, the operating member 50 moves forward with respect to the tray 30 by the balance of elastic forces of the compression springs B1 and B2. At this time, the slide piece 60 slides outward in the left-right direction Y as the engaging portion 61 moves along the first inclined portion 54b. As a result, the engaging portion 61 enters the rear locking portion 11d again and returns to the state shown in FIG. 6.

As described above, the optical wiring unit 3 of one or more embodiments includes the tray 30, the operating member 50 supported by the tray 30 so as to be movable on both sides (+X side) in the front-rear direction X as a reference to the neutral position (FIGS. 6 and 8C), the slide piece 60 having the latch portion 62; and the biasing portion B that biases the operating member 50 toward the neutral position. The slide piece 60 is slidable with respect to the operating member 50 between the restriction position (FIGS. 6 and 8C) and the release position (FIGS. 8A, 8D, or the like) where a protrusion amount from the operating member 50 is smaller than a protrusion amount of the restriction position. The slide piece 60 is located at the restriction position when the operating member 50 is at the neutral position, and is configured to slide toward the release position when the operating member 50 moves in the front-rear direction X from the neutral position.

According to such a configuration, in a case where the optical wiring unit 3 is at the storage position or at the pull-out position, the movement of the optical wiring unit 3 can be restricted by locating the slide piece 60 at the restriction position where a protrusion amount of the latch portion 62 is large, and locking the latch portion 62 to another structure (front locking portion 11c and rear locking portion 11d in one or more embodiments). Therefore, when performing the work of connecting the optical wiring unit 3 which is at the pull-out position, the optical wiring unit 3 is suppressed from moving, and workability is improved. Additionally, in a case where the optical wiring unit 3 is at the storage position, the optical wiring unit 3 is suppressed from moving unexpectedly.

The restriction by the latch portion 62 can be easily released by operating of pushing or pulling the operating member 50 in the front-rear direction X. Furthermore, the restriction of the movement of the optical wiring unit 3 and its release are realized by the movement of the slide piece 60, not by deforming the latch portion 62. For this reason, the operating force of the operating member 50 can be reduced as compared with, for example, a case where the latch portion is pushed and bent to release the restriction.

The biasing portion B includes a first compression spring B1 and a second compression spring B2 disposed side by side in the front-rear direction X, and the operating member 50 includes a first accommodating portion 52 that accommodates the first compression spring B1 and a second accommodating portion 53 that accommodates the second compression spring B2. The first accommodating portion 52 and the second accommodating portion 53 are partitioned by the partition wall 36 formed by the tray 30. In such a case, the operating member 50 can be biased toward the neutral position by a simple configuration in which two compression springs B1 and B2 are disposed side by side in the front-rear direction X.

The slide piece 60 is configured to slide in the left-right direction Y orthogonal to the front-rear direction X, and has the engaging portion 61 that protrudes in the up-down direction Z orthogonal to both the front-rear direction X and the left-right direction Y. In the operating member 50, the engagement groove 54a with which the engaging portion 61 engages is formed. The engagement groove 54a has the first inclined portion 54b inclined inward in the left-right direction Y toward the front side, and the second inclined portion 54c inclined inward in the left-right direction Y toward the rear side. In such a case, as the operating member 50 moves in the front-rear direction X from the neutral position, it is possible to slide the engaging portion 61 along the engagement groove 54a and move the slide piece 60 from the restriction position to the release position. That is, the operation of the operating member 50 in the front-rear direction X can be converted into the operation of the slide piece 60 in the left-right direction Y by the engagement groove 54a and the engaging portion 61.

The optical termination box 1 of one or more embodiments includes the optical wiring unit 3 and a side rail 10 having the front locking portion 11c and the rear locking portion 11d that are formed apart from each other in the front-rear direction X. The side rail 10 has the rail-side restricting portion 13 that restricts the forward movement of the optical wiring unit 3 beyond a predetermined pull-out position, the optical wiring unit 3 has the unit-side restricting portions 34 and 43 that abut the rail-side restricting portion 13 when the optical wiring unit 3 is at the pull-out position, and the front locking portion 11c is disposed at a position where the latch portion 62 is enterable when the optical wiring unit 3 is at the pull-out position. In such a case, when the operator pulls out the optical wiring unit 3 and releases the hand from the operating member 50 at a point when the optical wiring unit 3 stops at the pull-out position, the latch portion 62 automatically enters the front locking portion 11c. That is, the optical wiring unit 3 can be moved to the pull-out position and fixed at the pull-out position by one operation of gripping and pulling the operating member 50. Therefore, operability is further improved.

The optical termination box 1 has a stopper (the back plate of the housing 2 in one or more embodiments) that restricts the optical wiring unit 3 from moving rearward beyond a predetermined storage position, and when the optical wiring unit 3 is at the storage position, the rear locking portion 11d is disposed at a position where the latch portion 62 is enterable. In such a case, when the operator pushes the optical wiring unit 3 and releases the hand from the operating member 50 at a point when the optical wiring unit 3 stops at the storage position, the latch portion 62 automatically enters the rear locking portion 11d. That is, the optical wiring unit 3 can be moved to the storage position and fixed at the storage position by one operation of gripping and pushing the operating member 50. Therefore, operability is further improved.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, in the above-described embodiments, the two unit-side restricting portions 34 and 43 abut the rail-side restricting portion 13, thereby restricting the optical wiring unit 3 from moving forward beyond the pull-out position. However, only one unit-side restricting portion (the unit-side restricting portion 34 or the unit-side restricting portion 43) may be abutted against the rail-side restricting portion 13. That is, one unit-side restricting portion may be provided for one optical wiring unit 3.

Additionally, the biasing portion B of the above-described embodiments includes two elastic members (the first compression spring B1 and the second compression spring B2). However, the biasing portion B may have only one elastic member. A specific example of the biasing portion B that includes only one elastic member is a plate spring that protrudes in the left-right direction Y. Furthermore, grooves for engaging such plate springs may be formed in the tray 30. In a case where the above-described groove has a V shape and is open in the left-right direction Y, and the plate spring is in contact with a bottom portion of the groove, the plate spring elastically deformed toward the front or rear with the relative movement of the operating member 50 and the tray 30 in the front-rear direction X. Therefore, it is possible to bias the operating member 50 to the neutral position by the plate spring. The "neutral position" in such a case is a position of the operating member 50 when the plate spring is in contact with the bottom portion of the groove 21.

In addition, it is possible to appropriately replace the constituent elements in the above-described embodiments with well-known constituent elements without departing from the scope of the present invention, and the above-described embodiments and modification examples may be appropriately combined.

REFERENCE SIGNS LIST

1: Optical termination box
3: Optical wiring unit
10: Side rail
11c: Front locking portion
11d: Rear locking portion
13: Rail-side restricting portion
30: Tray
34, 43: Unit-side restricting portion
36: Partition wall
50: Operating member
52: First accommodating portion
53: Second accommodating portion
54a: Engagement groove
54b: First inclined portion
54c: Second inclined portion
55a: Engagement groove
60: Slide piece
61: Engaging portion
62: Latch portion
B: Biasing portion
B1: First compression spring
B2: Second compression spring
X: Front-rear direction
Y: Left-right direction
Z: Up-down direction

What is claimed is:

1. An optical wiring unit comprising:
a tray;
an operating member supported by the tray and that moves in a front-rear direction of the optical wiring unit as a reference to a neutral position;
a slide piece including a latch; and
one or more springs that bias the operating member toward the neutral position, wherein the slide piece:
slides with respect to the operating member between a restriction position and a release position in response to a pushing or pulling operation of the operating member, wherein a protrusion amount of the slide piece from the operating member at the release position is smaller than a protrusion amount of the slide piece from the operating member at the restriction position, and
is disposed at the restriction position when the operating member is at the neutral position and slides toward the release position when the operating member moves in the front-rear direction from the neutral position.

2. An optical wiring unit comprising:
a tray;
an operating member supported by the tray and that moves in a front-rear direction of the optical wiring unit as a reference to a neutral position;
a slide piece including a latch; and
one or more springs that bias the operating member toward the neutral position, wherein the slide piece:
slides with respect to the operating member between a restriction position and a release position, wherein a protrusion amount of the slide piece from the operating member at the release position is smaller than a protrusion amount of the slide piece from the operating member at the restriction position, and
is disposed at the restriction position when the operating member is at the neutral position and slides toward the release position when the operating member moves in the front-rear direction from the neutral position,
the one or more springs include a first compression spring and a second compression spring disposed side by side in the front-rear direction,
the operating member has a first accommodating portion that accommodates the first compression spring and a second accommodating portion that accommodates the second compression spring, and
a partition wall in the tray is disposed between the first accommodating portion and the second accommodating portion.

3. An optical wiring unit comprising:
a tray;
an operating member supported by the tray and that moves in a front-rear direction of the optical wiring unit as a reference to a neutral position;
a slide piece including a latch; and
one or more springs that bias the operating member toward the neutral position, wherein the slide piece:
slides with respect to the operating member between a restriction position and a release position, wherein a protrusion amount of the slide piece from the operating member at the release position is smaller than a protrusion amount of the slide piece from the operating member at the restriction position, and
is disposed at the restriction position when the operating member is at the neutral position and slides toward the release position when the operating member moves in the front-rear direction from the neutral position,
the slide piece slides in a left-right direction of the optical wiring unit orthogonal to the front-rear direction, and includes an engaging portion protruding in an up-down direction of the optical wiring unit orthogonal to the front-rear direction and the left-right direction, the operating member has an engagement groove with which the engaging portion engages, and the engagement groove has:
  a first inclined portion inclined toward an inside of the tray in the left-right direction toward a front side, and
  a second inclined portion inclined toward the inside of the tray in the left-right direction toward a rear side.

4. An optical termination box comprising:
the optical wiring unit according to claim 1; and
a side rail including:
  a front locking portion,
  a rear locking portion disposed apart from the front locking portion in the front-rear direction, and
  a rail-side restricting portion that restricts forward movement of the optical wiring unit beyond a pull-out position, wherein
the optical wiring unit includes a unit-side restricting portion that abuts the rail-side restricting portion when the optical wiring unit is at the pull-out position, and
the front locking portion is disposed such that the latch enters the front locking portion when the optical wiring unit is at the pull-out position.

5. The optical termination box according to claim 4, further comprising:
a stopper that restricts rearward movement of the optical wiring unit beyond a storage position, wherein
the rear locking portion is disposed such that the latch enters the rear locking portion when the optical wiring unit is at the storage position.

6. The optical wiring unit according to claim 2, wherein
the slide piece slides in a left-right direction of the optical wiring unit orthogonal to the front-rear direction, and includes an engaging portion protruding in an up-down direction of the optical wiring unit orthogonal to the front-rear direction and the left-right direction,
the operating member has an engagement groove with which the engaging portion engages, and
the engagement groove has:
  a first inclined portion inclined toward an inside of the tray in the left-right direction toward a front side, and
  a second inclined portion inclined toward the inside of the tray in the left-right direction toward a rear side.

7. An optical termination box comprising:
the optical wiring unit according to claim 2; and
a side rail including:
  a front locking portion,
  a rear locking portion disposed apart from the front locking portion in the front-rear direction, and
  a rail-side restricting portion that restricts forward movement of the optical wiring unit beyond a pull-out position, wherein
the optical wiring unit includes a unit-side restricting portion that abuts the rail-side restricting portion when the optical wiring unit is at the pull-out position, and
the front locking portion is disposed such that the latch enters the front locking portion when the optical wiring unit is at the pull-out position.

8. An optical termination box comprising:
the optical wiring unit according to claim 3; and
a side rail including:
  a front locking portion,
  a rear locking portion disposed apart from the front locking portion in the front-rear direction, and
  a rail-side restricting portion that restricts forward movement of the optical wiring unit beyond a pull-out position, wherein
the optical wiring unit includes a unit-side restricting portion that abuts the rail-side restricting portion when the optical wiring unit is at the pull-out position, and
the front locking portion is disposed such that the latch enters the front locking portion when the optical wiring unit is at the pull-out position.

9. An optical termination box comprising:
the optical wiring unit according to claim 6; and
a side rail including:
  a front locking portion,
  a rear locking portion disposed apart from the front locking portion in the front-rear direction, and
  a rail-side restricting portion that restricts forward movement of the optical wiring unit beyond a pull-out position, wherein
the optical wiring unit includes a unit-side restricting portion that abuts the rail-side restricting portion when the optical wiring unit is at the pull-out position, and
the front locking portion is disposed such that the latch enters the front locking portion when the optical wiring unit is at the pull-out position.

10. The optical termination box according to claim 7, further comprising:
a stopper that restricts rearward movement of the optical wiring unit beyond a storage position, wherein
the rear locking portion is disposed such that the latch enters the rear locking portion when the optical wiring unit is at the storage position.

11. The optical termination box according to claim 8, further comprising:
a stopper that restricts rearward movement of the optical wiring unit beyond a storage position, wherein
the rear locking portion is disposed such that the latch enters the rear locking portion when the optical wiring unit is at the storage position.

12. The optical termination box according to claim 9, further comprising:
a stopper that restricts rearward movement of the optical wiring unit beyond a storage position, wherein
the rear locking portion is disposed such that the latch enters the rear locking portion when the optical wiring unit is at the storage position.

* * * * *